March 19, 1957 R. A. ADAMSON 2,786,124
SOLDERING IRONS

Filed June 17, 1954 2 Sheets-Sheet 1

INVENTOR
ROBERT A. ADAMSON
By Emory L. Groff
ATTORNEY

March 19, 1957 R. A. ADAMSON 2,786,124
SOLDERING IRONS
Filed June 17, 1954 2 Sheets-Sheet 2

INVENTOR
ROBERT A. ADAMSON
By Emory L. Groff
ATTORNEY

United States Patent Office 2,786,124
Patented Mar. 19, 1957

2,786,124

SOLDERING IRONS

Robert Alfred Adamson, West Wickham, Kent, England

Application June 17, 1954, Serial No. 437,411

4 Claims. (Cl. 219—26)

This invention relates to electrically heated soldering irons and has for its primary object to provide a construction which enables irons of small dimensions to be built, particularly for use on delicate equipment such as electronic equipment, which irons can be used on normal mains voltages.

A further and important object of the present invention is to provide a construction of small mains-energised iron, which is robust and in which extremely efficient heat conduction from the heater resistance wire to the soldering bit is obtained. The construction can, however, be used on low voltage supplies.

When designing small irons, a very real problem is present in that if the bit temperature under normal working conditions is much below the temperature of the heater, then either the bit cannot be made sufficiently hot for normal requirements, or owing to small dimensions it is impossible to construct the heater so that it has a reasonable life. Another problem which exists is rapid corrosion of the bit due to overheating, flux corrosion and tin amalgam with the copper especially when using solder with a high tin content.

The invention herein, therefore, seeks further as an object to provide a truly miniature iron which can be used amongst bunched wires with little risk of insulation damage due to burning, and which has a long life.

Another object of the invention is to provide an iron in which the bit can be removed and a new one placed in position easily and quickly.

Small irons such as contemplated by this invention, must necessarily have excellent heat transference from the heater to the bit, so that there can be little loss up towards the handle. Copper, because of its high co-efficient of thermal conductivity and cheapness is the ideal metal to use for the bit body, but this metal is very prone to corrosion, and is ductile, so that pressure during use may result in bending and damage.

I have, therefore, made certain useful improvements in the construction of electrically heated soldering irons, which have resulted in the production of a small, efficient long life iron, as particularly set forth in the claims hereto appended. Under test, I have found that after energising from mains supply, for a period of over eleven months, and continually day and night, the iron shows no signs of breaking down, and can be used for soldering at any time. The close limit of temperatures between heater and bit have meant there is no overheating so that the element is still operating, nor has there been any marked burning away of the bit.

Reference will now be made to the accompanying drawings illustrating non-restricting constructional forms, wherein:

Figure 8 is a view of the completed iron of Figures 5 and 6, that of Figures 1–4 being generally similar.

Figure 7:
Figure 7 is a sectional elevation of a modification of the iron shown in Figures 5 and 6, but which also can be applied to the iron of Figures 1–4.
Figure 8:

The general construction of the iron is shown best in Figures 7 and 8 and the iron body includes a tube or shell 6 for carrying the bit, this tube 6 being supported by a supporting tube 7 with which it is in axial alignment, said tube 7 carrying a bush 10 at its end, which in turn carries a tubular handle 11. The supporting tube 7 is of rigid metal, is thin walled and of a diameter to impart sufficient strength to the body, and filled with a heat insulating material 7a. In the constructions of Figures 1–4 and 7, a copper plug 8 is within the carrier tube 6. The tube 6 is of stainless steel. The heater element is wrapped around the greater part of the tube or shell 6, with the interposition of suitable insulating material such as mica, this assembly being designated 9. The wrapping is such that the end of the tube 6 opposite the end connected to the tube 7 is left projecting, to receive the bit.

The other end of the rod or shaft is secured to a handle which as shown (Figure 8) is a tube or rod 11 and is secured through the medium of the bush 10, and a protective cover is provided around the element, consisting of a close-wound iron wire covering 12 which extends over the element and right up to the handle. Suitable insulation is of course interposed.

Figure 1:
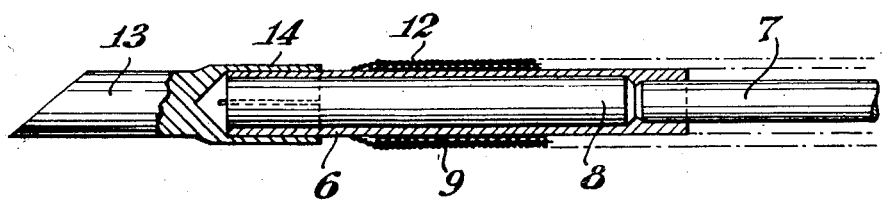
Figure 1 is a sectional elevation of one form with the bit in position.
Figure 2:
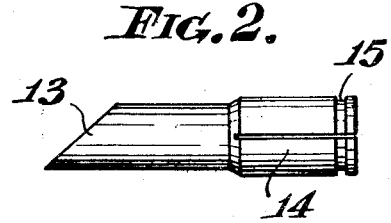
Figure 2 shows an alternative bit construction.
Figure 3:
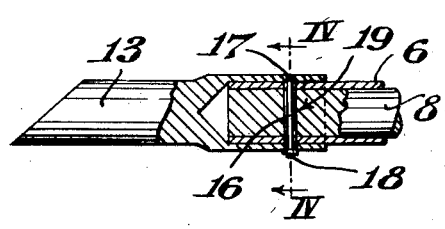
Figure 3 is a sectional elevation of another form of bit.
Figure 4:
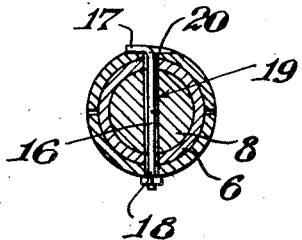
Figure 4 is a section on the line IV—IV of Figure 3.

As shown in Figure 1, the bit comprises a solid copper part 13 having a split skirt 14 at its rear end into which the projecting end of the shell 6 fits. The rear end of the skirt may be grooved as at 15 (Figure 2) and a C-spring fit therein. In such a case the spring used should be of a metal which will not lose its temper at working temperatures, and is resistant to tinning. A pin could be used to fix the bit, as shown in Figures 3 and 4, and the pin 16 should be made from stainless steel or nickel-chrome rod or wire to be resistant to tinning, and having a part 17 bent over at one end to form a head and a threaded part 18 at the other end. The sleeve and body end have aligning holes 19 for the passage of the pin, the sleeve at one end having a transverse milled slot 20 for the reception of the head. The slot is deep enough to allow the bolt to close down and hold the parts together when the nut is tightened, and the angle of the bolt head is such as to ensure the bit is rigidly held.

The above arrangement is for very light irons. Irons with heavier bits could be anchored by more than one pin, mainly to ensure the sleeve is held firmly in contact with the body end and to reduce distortion if the plating of the bit is damaged.

Figure 5:
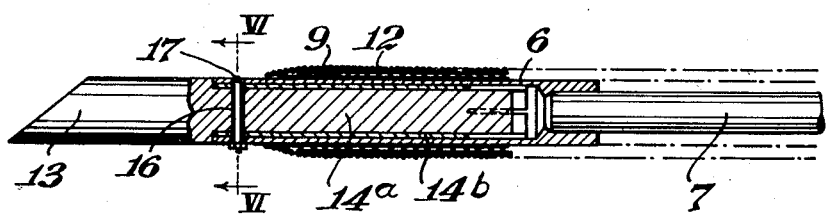
Figure 5 is a sectional elevation of an alternative construction.
Figure 6:
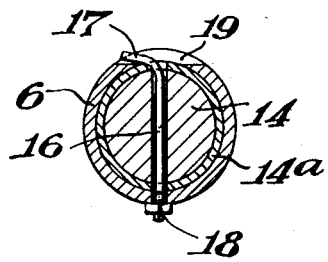
Figure 6 is a transverse section on the line VI—VI of Figure 5.

Referring now to Figures 5 and 6, the bit consists of the end part 13, and a shank 14a integrally therewith, and conveniently of reduced cross-section compared with the bit proper as shown. This shank has a thin covering 14b of stainless stell such as a sleeve, although other metal resistant to tinning and corrosion could be used, such as pure iron. Also the shank may be coated with a suitable material by electro-chemical deposition. The arrangement is such that the shank fits into the hollow sleeve firmly and snugly, and suitable means, which are readily released, are provided for retaining the shank in the body tube.

In the case where a sleeve 14b is used to encase the shank 14a, as shown, to secure firm holding, said sleeve can project at its inner end beyond the bit shank 14a, and this projecting part cut to provide a springy end to grip in the tube. Thus a transverse cut could be made to provide a C spring at the end, which is opened slightly to serve to grip the interior of the tube frictionally. Alternatively, and as shown, the part could be slitted longitudinally. The shank is retained at the outer end by suitable means, such as a cotter pin or bolt 16. In the example shown, the projecting tube end part and shank 14a are drilled through diametrically so that the pin or bolt 16 can pass through aligning holes. The bolt, consisting of nickel-chrome or stainless steel wire, and its method of fixing is the same as described with reference to Figures 3 and 4.

With the construction described, as there is no risk of seizure, the shank can fit tightly in the body tube, and heat is conducted to the bit proper almost equally well as in a construction having a solid copper shank and body, as the stainless steel or the like is not of great thickness, and large surface areas are in contact. The construction is strong, and, when used with small irons, is an advantage as the steel tube has a high degree of resistance to bending.

The stainless steel or like pin also can be removed easily, and the risk of damage to the element is reduced.

For large-sized bits it is sometimes desirable to be able to heat and hammer the bit out to a taper, and in such cases the stainless steel sleeve on the part 14 is advantageous as the sleeve is more resistant to damage than copper. A separate handle with tube holder could be provided specifically to hold the bit for heating and hammering.

As shown in Figure 7, the shank consists of a tube which preferably is of mild or silver steel which is lightly packed with asbestos, glass wool or like material 7a. The hollow bit carrying sleeve 6 can fit on to the end of the tube 7, the end of which is plugged, for example, with a metal disc 21 to retain the fibre.

The end of the tube remote from the body is solid or plugged, and a spindle-like part 22 projects therefrom, for securing to the bush or collar 10 which serves to fix the shank to the handle.

The shank may fix by means of the nut 23 which threads on to the threaded part 22, the part 24 in the bush being splined to prevent turning. The tag washer 25 is used for "earthing" the iron body assembly. Alternatively, the tube end part 22 could screw into a blind tapped hole in the bush, said bush being grooved and slotted for wire connection.

It will be noted particularly in the construction herein that the body virtually is solid right from the tip up to the bush, but that the greater length of the supporting core is constructed so that little heat is lost up towards the handle. There is intimate and close metal contact right from the sleeve 6 to the bit tip so that heat losses between heater and bit tip are kept to a minimum.

I have also found that it is possible to utilise pure iron for the bit. This results in a construction in which corrosion and pitting is practically non-existent. The conductivity of pure iron is lower than copper, and it is therefore advisable to utilise a construction similar to that shown in Figure 1, wherein the parts 13 and 14 are of pure iron, and the tube 6 plugged with a copper core 8.

What I claim is:

1. An electrically heated soldering iron comprising a thin walled axial supporting tube of metal, a bush mounted at one end of said tube, a tubular handle carried by said bush, heat insulating material within said tube, a thin walled bit carrying tube of corrosion resistant metal mounted on the other end of said supporting tube and in axial alignment therewith, a plug fitting tightly in said bit carrying tube and having the soldering bit at its end out of the said tube, a resistance heater winding over said bit carrying tube, with its ends for connection taken up along the outer surface of the supporting tube and connected to terminal parts carried by the bush, and a close helically wound wire protective sheath extending to enclose the heater wire and up the supporting tube to the bush.

2. A soldering iron as claimed in claim 1, comprising additionally an integral plug and soldering bit, with means for locking same in the bit carrying tube in a readily removable manner.

3. A soldering iron as claimed in claim 2, comprising additionally and anti-corrosive metal shell over and secured to the plug, with the shelled plug fitting tightly into the bit carrying tube.

4. An electrically heated soldering iron comprising a thin walled axial supporting tube of metal, a bush mounted on one end of said tube, a tubular handle carried by said bush, heat insulating material packed in said supporting tube, a thin walled bit carrying tube of corrosion resistant metal mounted on the other end of said supporting tube and in axial alignment therewith, a copper plug fitting tightly within the bit carrying tube and a soldering bit of tinnable corrosion resistant metal and having a skirt end for fitting on to the end of the bit carrying tube, a resistance heater winding over said bit carrying tube with its ends taken up along the outer surface of the supporting tube and connected to terminal parts carried by the bush, and a close helically wound wire protective and strengthening sheath extending to enclose the heater wire and up the supporting tube to the bush.

References Cited in the file of this patent

UNITED STATES PATENTS

| | | |
|---|---|---|
| 1,697,962 | Meyer | Jan. 8, 1929 |
| 2,041,018 | Persons | May 19, 1936 |
| 2,099,792 | Beadling | Nov. 23, 1937 |
| 2,213,438 | Young | Sept. 3, 1940 |
| 2,518,265 | Adamson | Aug. 8, 1950 |
| 2,588,531 | Johnson | Mar. 11, 1952 |

FOREIGN PATENTS

| | | |
|---|---|---|
| 552,837 | Great Britain | Apr. 27, 1943 |